(12) United States Patent
Rudd et al.

(10) Patent No.: US 6,490,048 B1
(45) Date of Patent: Dec. 3, 2002

(54) TOMOGRAPHIC RECONSTRUCTION OF ELECTRONIC COMPONENTS FROM SHADOW IMAGE SENSOR DATA

(75) Inventors: Eric P. Rudd, Hopkins; Steven K. Case, St. Louis Park, both of MN (US)

(73) Assignee: CyberOptics Corporation, Golden Valley, MN (US)

( * ) Notice: Subject to any disclaimer, the term of this patent is extended or adjusted under 35 U.S.C. 154(b) by 0 days.

(21) Appl. No.: 09/432,686

(22) Filed: Nov. 3, 1999

Related U.S. Application Data

(60) Provisional application No. 60/106,860, filed on Nov. 3, 1998.

(51) Int. Cl.[7] .................. G01B 11/24; G01B 11/14; G01B 11/28; G01N 21/86
(52) U.S. Cl. ................. 356/601; 356/614; 356/628; 250/559.22
(58) Field of Search ................. 356/601, 613, 356/614, 615, 622, 625, 628, 629, 634, 635, 638; 250/559.19, 559.21, 559.22, 559.24, 559.29, 559.3; 382/141, 143, 145, 146, 147, 151

(56) References Cited

U.S. PATENT DOCUMENTS

| | | | |
|---|---|---|---|
| 3,781,115 A | 12/1973 | Rader et al. ................. 356/167 |
| 4,559,452 A | 12/1985 | Igaki et al. ................. 250/560 |
| 4,615,093 A | 10/1986 | Tews et al. ................... 29/407 |
| 4,628,464 A | * 12/1986 | McConnell ................. 364/513 |
| 5,278,634 A | 1/1994 | Skunes et al. ............... 356/400 |
| 5,455,870 A | * 10/1995 | Sepai et al. ................. 382/147 |
| 5,467,186 A | 11/1995 | Indo et al. .................. 356/150 |
| 5,471,310 A | * 11/1995 | Spigarelli et al. ........... 356/399 |
| 5,559,727 A | 9/1996 | Deley et al. ................. 364/559 |
| 5,570,993 A | 11/1996 | Onodera et al. ............. 414/783 |
| 5,619,528 A | 4/1997 | Rebec et al. ................. 375/219 |
| 5,739,525 A | * 4/1998 | Greve .................... 250/227.11 |
| 5,897,611 A | 4/1999 | Case et al. .................. 702/150 |
| 5,900,940 A | * 5/1999 | Aoshima .................... 356/375 |
| 6,100,922 A | * 8/2000 | Honda et al. ................. 348/86 |

FOREIGN PATENT DOCUMENTS

| | | |
|---|---|---|
| GB | 2 183 820 A | 6/1987 |
| JP | 63249018 | 10/1988 |
| JP | 11040991 | 2/1999 |
| JP | 11040992 | 2/1999 |
| JP | 11068397 | 3/1999 |
| JP | 11068398 | 3/1999 |
| JP | 2001230597 | 8/2001 |

OTHER PUBLICATIONS

Samsung Electronics Brochure dated Jan. 2001.

* cited by examiner

*Primary Examiner*—Michael P. Stafira
(74) *Attorney, Agent, or Firm*—Westman, Champlin & Kelly, P.A.

(57) ABSTRACT

One aspect of the present invention includes a novel method of providing a set of vertices representative of the outline of an opaque object so that an outline of the object can be made from the set of vertices. The method includes the step of casting a shadow of the object onto a detector while the object is held at an angle and then detecting at least one edge of the shadow image. Once at least one of the edges in the shadow image is known, a data pair formed by the at least one shadow edge and its corresponding angle is preferably stored. The steps of casting and detecting are repeated until a plurality of data pairs is stored. Finally, a set of vertices is computed from the plurality of data pairs. An outline of the object can be made by plotting the set of vertices, for example, for use in viewing an outline of the object.

14 Claims, 8 Drawing Sheets

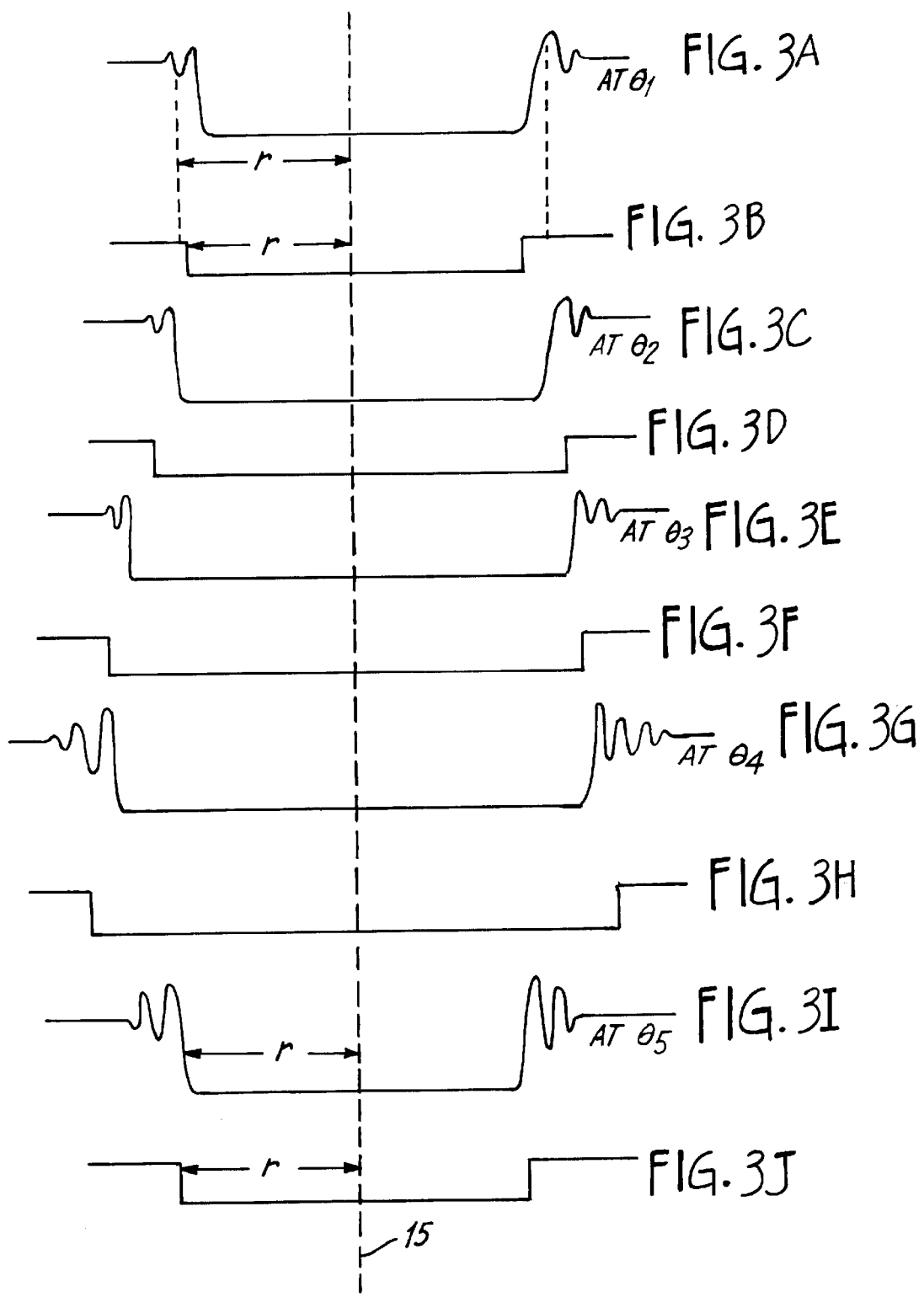

TOMOGRAPHIC RECONSTRUCTION OF ELECTRONIC COMPONENTS FROM SHADOW IMAGE SENSOR DATA

This application claims priority benefits from U.S. provisional patent application Ser. No. 60/106,860 entitled "TOMOGRAPHIC RECONSTRUCTION OF ELECTRONIC COMPONENTS FROM SHADOW IMAGE SENSOR DATA" filed on Nov. 3, 1998.

COPYRIGHT RESERVATION

A portion of the disclosure of this patent document contains material which is subject to copyright protection. The copyright owner has no objection to the facsimile reproduction by anyone of the patent or the patent disclosure, as it appears in the Patent and Trademark Office, patent file or records, but otherwise reserves all copyright rights whatsoever.

FIELD OF THE INVENTION

The present invention relates to methods for computing the x,y and θ orientation of an object in a system, such as orienting an electronic component for placement on a PC board, as in a pick and place machine.

BACKGROUND OF THE INVENTION

Electronic shadowing techniques incorporated in optical-based sensors are also in widespread use, today in the electronics industry in pick and place machines for mounting electronic components on printed circuit boards. One of the most commonly used position alignment sensors is manufactured by Cyberoptics corporation in Golden Valley, Minnesota and is sold as a LaserAlign® component alignment sensor. LaserAlign type sensors use a light focused into a stripe of light, which is typically incident on the side of an electronic component, thereby forming a shadow which is cast onto a detector. When the electronic component is rotated (by a nozzle controlled in x, y and z direction by the pick and place machine) the shadow cast on the detector changes in width. when the width of the shadow is minimized at a cusp, the position of the component in one axis and its orientation (i.e., angular position) of the component with respect to the nozzle axis of rotation is known. The pick and place machine then rotates the component approximately ninety degrees, and completes the same process again to establish the position of the component in another direction. The output of the sensor and the attendant processing of the sensor output provide an indication of translational and rotational movements which the pick and place machine must perform before the component can be accurately set onto the PC board. U.S. Pat. No. 5,278,634 to Skunes et al., owned by the same assignee as the present invention and hereby incorporated by reference, discloses a LaserAlign® sensor.

The orientation process is generally carried out while the pick and place machine is transporting the component to a target printed circuit for placement. When the orientation process is carried out simultaneously with the transport of the component, the orientation process is sometimes referred to as an "on-head" or an "on-the-fly" measurement. Conversely, "off-head" measurements are made when the sensor is not affixed to the pick and place head but rather, is stationary relative to the head.

However, data from these sensors is sometimes less than optimal for orienting the component when the component does not have sharp corners. Further, it is sometimes desirable to have more resolution of the outline of a complex component without sacrificing speed.

SUMMARY OF THE INVENTION

One aspect of the present invention includes a novel method of providing a set of vertices representative of the outline of an opaque object so that an outline of the object can be made from the set of vertices. The method includes the step of casting a shadow of the object onto a detector while the object is held at an angle and then detecting at least one edge of the shadow image. Once at least one of the edges in the shadow image is known, a data pair formed by the at least one shadow edge and its corresponding angle is, preferably stored. The steps of casting and detecting are repeated until a plurality of data pairs is stored. Finally, a set of vertices is computed from the plurality of data pairs. An outline of the object can be made by plotting the set of vertices, for example, for use in viewing an outline of the object.

The method of the present invention is useful in the electronic assembly industry, where pick and place machines accurately place electronic components on printed circuit boards. Once the set of vertices of the component is known from the present invention, the position and angle of the component relative to a known reference axis in the pick and place machine can be computed and compared against the desired position and angle of the component on the printed circuit board. A correction instruction for the pick and place machine is computed as a function of the desired position and the present position, which the pick and place machine executes so as to accurately place the component onto the printed circuit board.

In another aspect, an optical sensor with a light source and a detector is also disclosed which practices the shadow casting step of the present invention. The sensor is coupled to processing electronics of the present invention which locate the edge of the shadow image received from the detector in the sensor, compute the set of vertices and optionally reconstruct the outline of the component under test. In an alternate embodiment, the edge detection and processing electronics are located in the sensor.

BRIEF DESCRIPTION OF THE DRAWINGS

FIGS. 3A–3J are pairs of graphs showing the output from a detector in a sensor of the present invention at various angular positions, $\theta_1$–$\theta_5$ and the resulting two state representation of the shadow image for each angle $\theta_1$–$\theta_5$.

For convenience, items in the figures having the same reference symbol are the same or serve the same or a similar function.

DETAILED DESCRIPTION OF THE ILLUSTRATIVE EMBODIMENTS

The present invention provides a tomographic reconstruction apparatus and technique for reconstructing the outline of an object using data pairs including the angle of the nozzle at which the shadow was projected and at least one edge location of the shadow cast onto the detector by the object. The shadows are cast onto a detector in a sensor while the object is rotated relative to the sensor. This technique can be used in, for example, a pick and place machine 10 such as that illustrated in FIG. 1.

Figure 1:
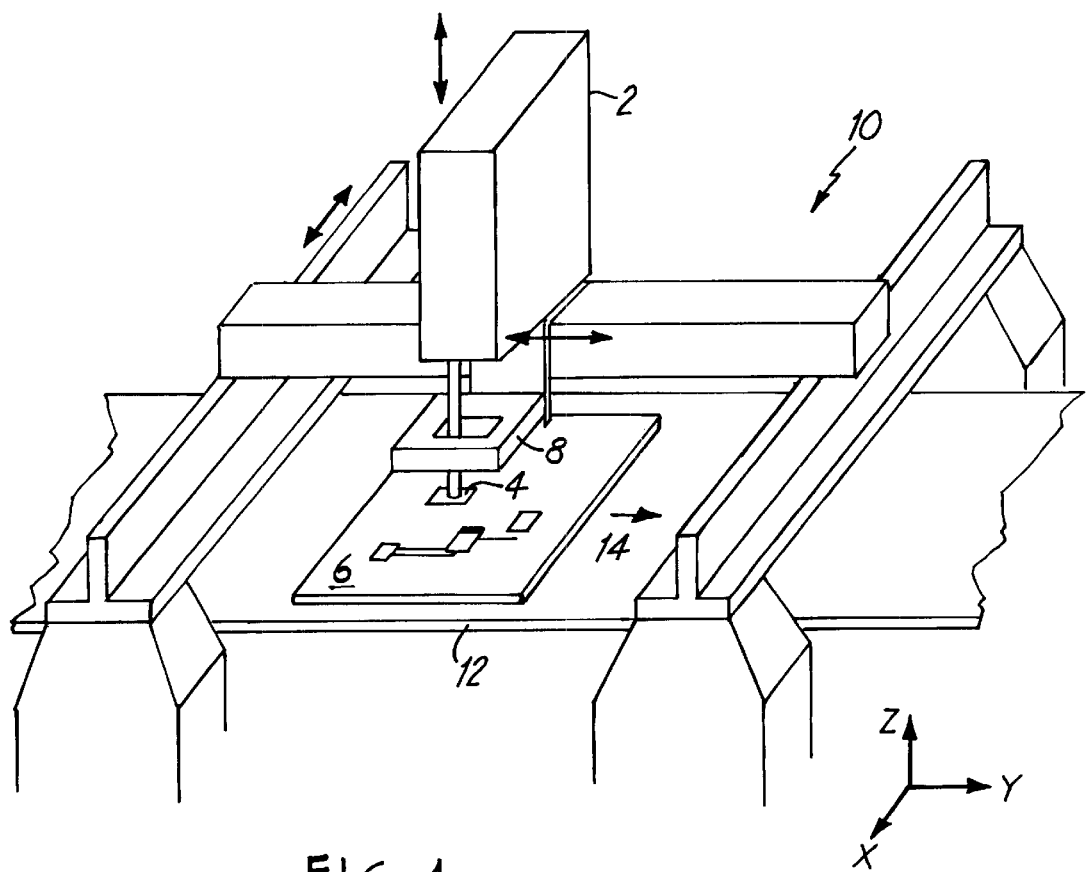
FIG. 1 shows a pick and place machine, including a sensor of the present invention.

FIG. 1 shows a pick and place machine 10 having independent motor drives (not shown) for movement of a head 2 in either the x or the y directions. There is an additional, motor and motor drive electronics (see FIG. 2A) in the pick and place machine for raising, lowering and angularly rotating a component 4 for is placement onto a target printed circuit board 6. Circuit board 6 moves along a conveyor system 12 in a direction indicated by arrow 14. The pick and place machine 10 is shown with a shadow casting sensor 8 of the present invention for determining orientation of component 4.

Sensor 8 is mounted under head 2 in an "on-head" configuration since sensor 8 is able to perform its sensing measurement while head 2 moves component 4 towards the proper place on board 6. However, the present invention may be practiced with any type of pick and place machine, including those known generally in the industry as "off-head", "on-the-fly" and ones operating under other types of measurement. After head 2 places the components on target board 6 and the board is fully populated, another board is moved into place under the head by conveyor system 12 and the process starts over again.

Figure 2A:
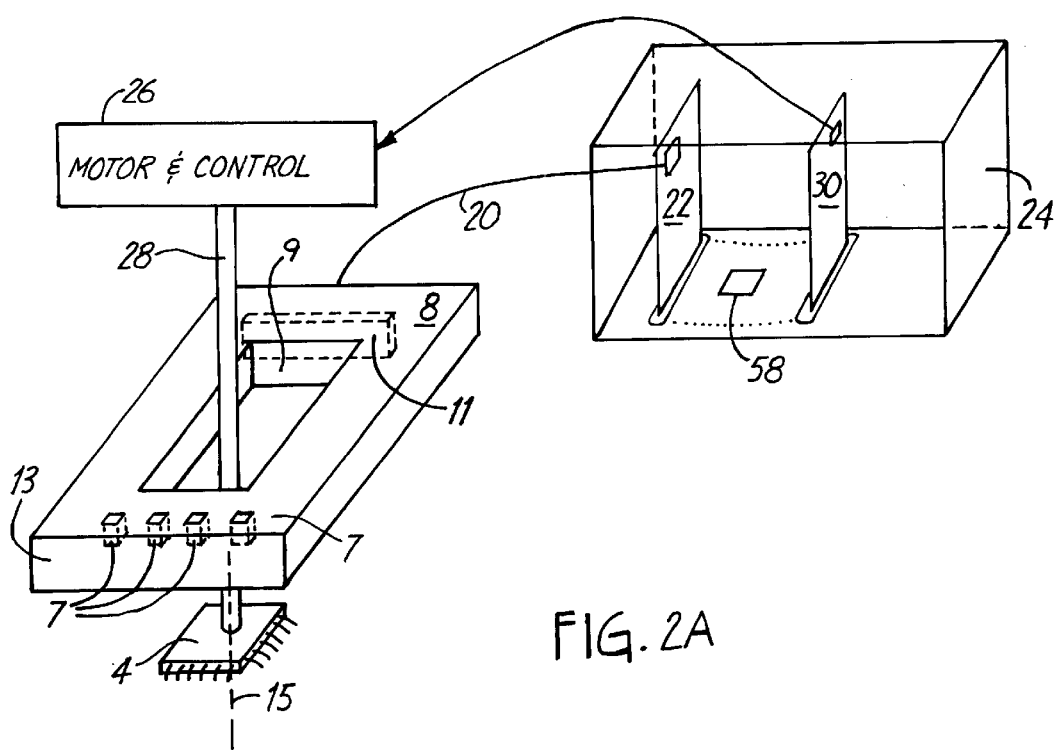
FIG. 2A shows the sensor in FIG. 1 as used with motor control electronics, motor drive and electronics on printed circuit boards in a pick and place machine.

In FIG. 2A, sensor 8 is shown with an output cable 20 connecting sensor 8 electronically to, a PC board 22 in a card cage 24 located in pick and place machine 10 or at another control location. Motor and control electronics block 26 provide z direction movement as well as accurate angular movement for component 4, which is held in place by a nozzle and quill assembly 28 commonly used in the pick and place industry. Nozzle and quill assembly 28 have an axis 15 extending therethrough. Electronics including a detector 11 located in sensor 8 output data on coaxial cable 20, which data is representative of the outline of shadows cast of component 4 onto detector 11. The transfer of data preferably occurs in real time in order to reduce the amount of time necessary to place each component. The sensor electronics consist of the CCD array detector 11, circuitry to apply clocking waveforms to the CCD array, an A/D converter 50 to digitize the video signal from the CCD array 11, digital interface electronics 52 to couple to digital output onto a cable 54 for transmission to a computer, and digital control electronics to coordinate the overall sensor operation. Pick and place machine 10 includes at least another board 30 which computes and provides instructions to motor and control block 26 on head 2, based on the electronic output of the accurate angular encoder in block 26 and the output from sensor 8 via electronics on board 22. In an alternative embodiment of the present invention, all the electronics for providing the set of vertices are located within housing 13 of sensor 8.

Figure 2B:
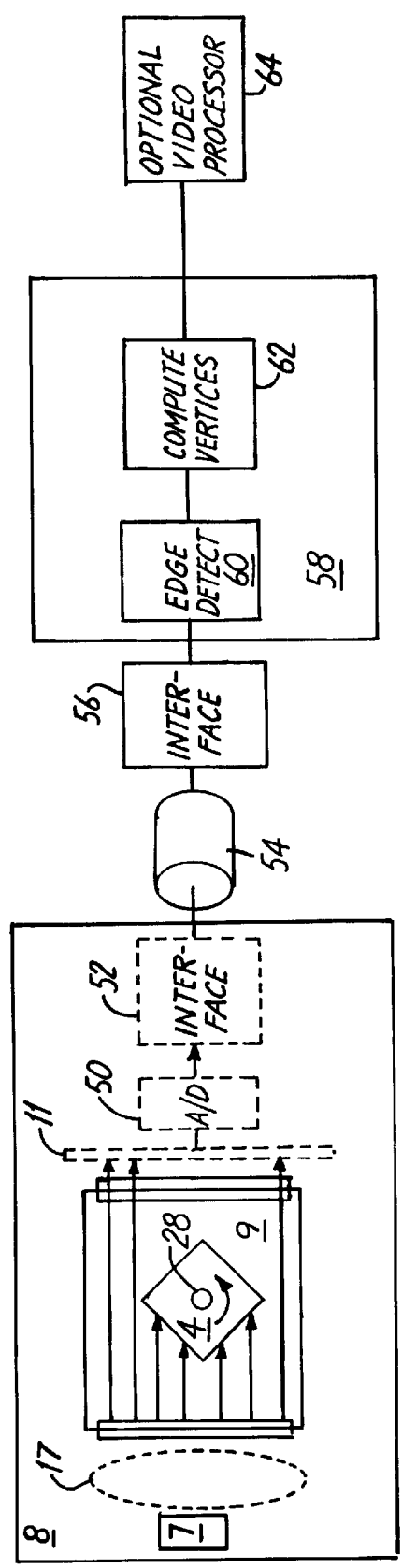
FIG. 2B shows one embodiment of hardware for practicing the present invention.

FIG. 2B shows an embodiment of the hardware of the present invention, practiced in sensor 8 and electronics on board 22 within pick and place machine 10. Component 4 is rotated to various angles θ on nozzle assembly 28. Rays of parallel light from collimated light source 7 fall onto detector 11 and create a shadow image on detector 11. Detector 11 is preferably a linear detector array and has 1024 pixels of 13×13 μm size and each pixel outputs a gray-scale analog value representative of the intensity of the shadow cast onto detector 11. There are various output formats for linear array detectors, but a 2 tap output is preferred since it reduces the time required to clock out all the pixels in detector 11. An analog to digital converter 50 receives the output from detector 11 and converts it into a digital value preferably with 10 bits of resolution. The output of the converter 50 is connected to interface electronics 52, for formatting the signal for transmission over cabling 54. Interface electronics 56 translate the signal into a digital format and a processor 58, preferably embodied in an Intel® chip, includes code for the edge detection algorithm 60 disclosed herein and the vertex computation shown at 62 and given by Equation 2 herein. optionally, the set of vertices is provided to video processor block 64, which plots the sets of x,y points to display the outline of component 4.

Any other electronics which operate with an optical source and some sort of a detector on the principle that the effective width of a cast shadow is assessed while the component is rotated, until such width is minimized, to establish the x,y relative position of the component may be used with the method of the present invention.

A light source 7 is preferably located in sensor 8. In a preferred embodiment, light source 7 is a laser diode, point source or other source with attendant optics which provides substantially parallel light rays in the vicinity of component 4. However, any light of sufficient light intensity can be used to practice the present invention or even non-visible radiation when matched with a detector for detecting such radiation. As with the method described in Skunes et al., the present invention is not limited to any specific type of light source. In particular, neither the wavelength of the light, nor its coherence, nor its phase are critical in the present invention. The main criterion for the source is that it provide light of sufficient intensity, so that after passing through the cavity area a which accepts the components and whatever filters which may be present (at the housing of sensor 8), the light received at the detector has enough intensity to provide a robust signal for the electronics. The present invention may also be practiced with multiple light sources or alternative arrangements for providing the light used to cast the shadow. Further, the invention is not limited to the particular implementation of the housing shown in this application.

Using the shadow position and angles generated it is possible to reconstruct the convex outline or convex hull of an object. Note that the convex hull does not exactly correspond to the outline of the part and can be imagined as the shape assumed by a rubber band which is tightly stretched around the length of the object. For example, consider a stapler, which has many spaces within its external outline. The convex hull of the stapler as provided by the present invention will yield an outline of the stapler with a rubber band stretched around its length. The spaces present between the rubber band and the stapler will not be visible in the reconstructed outline with the present invention.

During operation, detector 11 produces a sequence of detector images as object 4 rotates, as illustrated in FIGS. 3A, 3C, 3E, 3G and 3I. FIGS. 3B,3D,3F,3H and 3J show the two state edge representation of the detector image shown at FIGS. 3A,3C,3E,3G and 3I, respectively. Each parameter r in such FIGS. represents the distance from a shadow image edge to the component rotational axis 15 (the "half shadow width"). The parameter r varies with angle θ where θ is the angle of the ray with respect to the quill (as best seen in FIG.

5). Since, for collimated light, the rays are always parallel to the instrument axis 15, θ is related to quill angle φ by:

$$\theta = -\phi \qquad \text{EQ. (1)}$$

Conventional computationally intensive techniques of tomographic reconstruction of the objects outline could be applied to the gray-scale information in the detector images. However, the present invention is applied to opaque objects, which provides for the computational efficiency of the present invention. In the present invention, only the location of the at least one edge of the shadow cast onto the detector at a plurality of rotational angles is necessary to reconstruct the vertices of the opaque object. Because the present invention uses only the at least one edge location of the shadow image as contrasted to the gray-scale representation of the light or radiation which penetrates through a semi-transparent object at each angle, the present invention is more efficient and less computationally intensive than prior art techniques for tomographic reconstruction of an outline.

In the present invention, the intersection between adjacent lines (which become a polygon vertex) can be calculated by solving two simultaneous equations for each polygon:

$$\begin{bmatrix} \cos\theta_I & \sin\theta_I \\ \cos\theta_{I-1} & \sin\theta_{I+1} \end{bmatrix} \begin{bmatrix} x \\ y \end{bmatrix} = \begin{bmatrix} r_I \\ r_{I+1} \end{bmatrix}, \qquad \text{EQ. (2)}$$

where $\theta_I$ is the angle at which the radial parameter $r_I$, is taken. The radial parameter as used in EQ. (2) is the distance from the shadow edge to the axis of rotation 15. This is evaluated n times to generate the n vertices of a convex hull. Several hundred vertices are computed for a typical convex hull.

Figure 4:
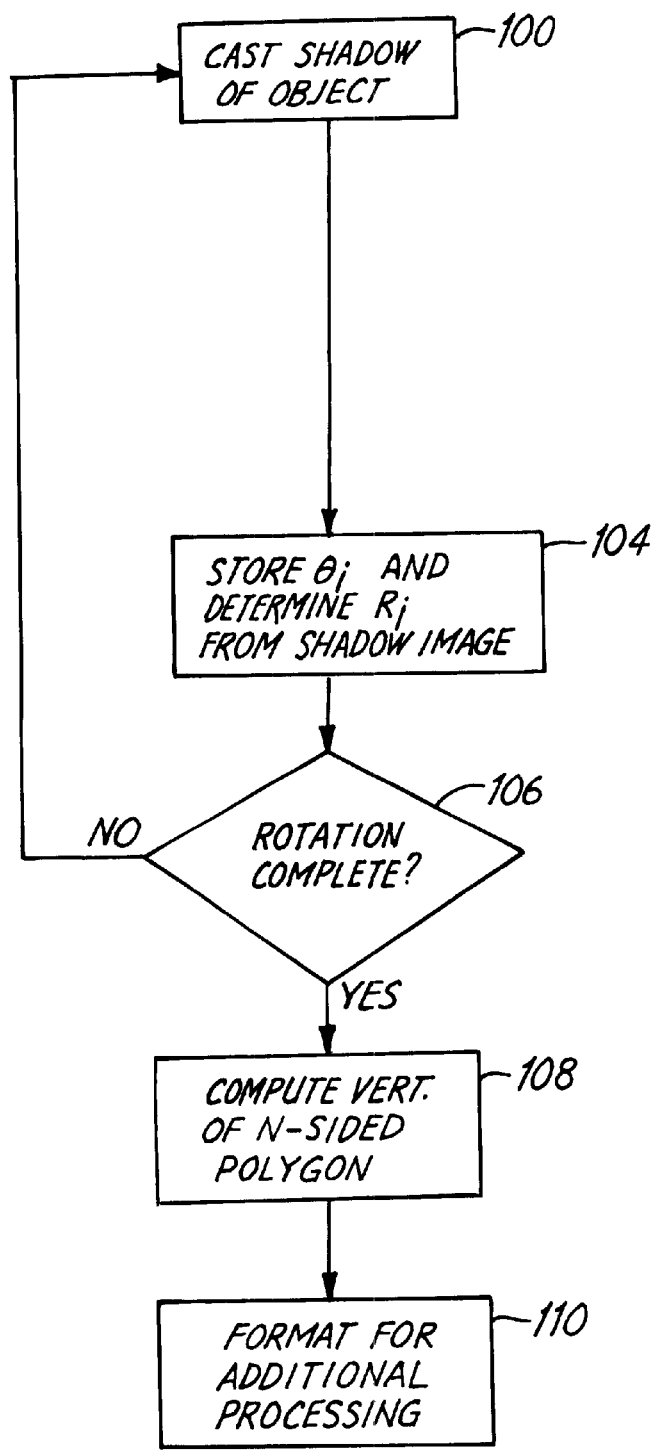
FIG. 4 is a flowchart illustrating steps in accordance with one embodiment of the present invention.

In FIG. 4, the method of the present invention begins in block 100 by casting a shadow onto component 4, preferably using source 7 in sensor 8. At block 104, the $\theta_I$ value is stored and the location of an edge of the shadow image ($r_I$) is determined. The location of the edge of shadow image, as output in gray-scale pixel values from detector 11, can be extracted by a number of techniques. In general, the techniques include differentiating the gray-scale shadow image to produce a peak at each edge location. Filtering the differentiated image with a lowpass filter reduces high frequency noise. Next, processor 50 computes the centroid of the resulting peak, considering only pixels within a certain neighborhood of the peak. The present invention, when practiced with the disclosed edge detection algorithm yields sub-pixel resolution. If the object has not been fully rotated through 360 degrees at block 106, control is passed back to block 100 for collection of additional data at additional angles. In practice, the component is continuously rotated at high speed, the source is continuously turned on, and the electronics 22 strobe the detector 11 appropriately to capture data at successively increasing angles of rotation. It is also understood that the present invention would allow gray scale values to be stored until all data collection is finished, and then the edge of a shadow image located and the set of vertices computed. Once the rotation and data collection is complete, the vertices of an insided polygon are computed at block 108 using the pairs of data ($\theta_I$, $r_I$) according to Eq. 2. At block 110, this data can be formatted for subsequent processing. For example, an operator may then view the "hull" outline of the component.

In the event that both edges of component 4 can be measured at a given angle θ, rotation and data collection can be performed substantially over 180° degrees.

If the data from sensor 8 is completely consistent, the approach set forth above with respect to Equation 2 is sufficient to determine the complex hull of an object. Unfortunately, the shadows may not be completely consistent with a convex hull. For example, one shadow may have a width parameter v which causes it to lie completely outside of the hull formed by the other shadows. The technique set forth above will create a spurious, concave polygon when such a shadow is incorporated.

One solution to this problem is to compute the minimal convex polygon comprised of the lines from the sensor which bound some point known to be within the object 4. Generally, the rotational axis is of the object is a suitable point.

In the previous discussion, the light is presumed collimated and parallel. Specifically, since the rays of light emitted from source 7 are all of the same angle (relative to the instrument coordinate frame), the ray angle θ is simply equal to the negative of quill angle φ, which is known from an encoder on the quill holding the part. Furthermore, the location of the shadow on the CCD array of sensor 8 is the same as the radial parameter r. Thus, from shadow images taken at two angles, enough information is known to immediately solve Eq. 2.

Figure 5:
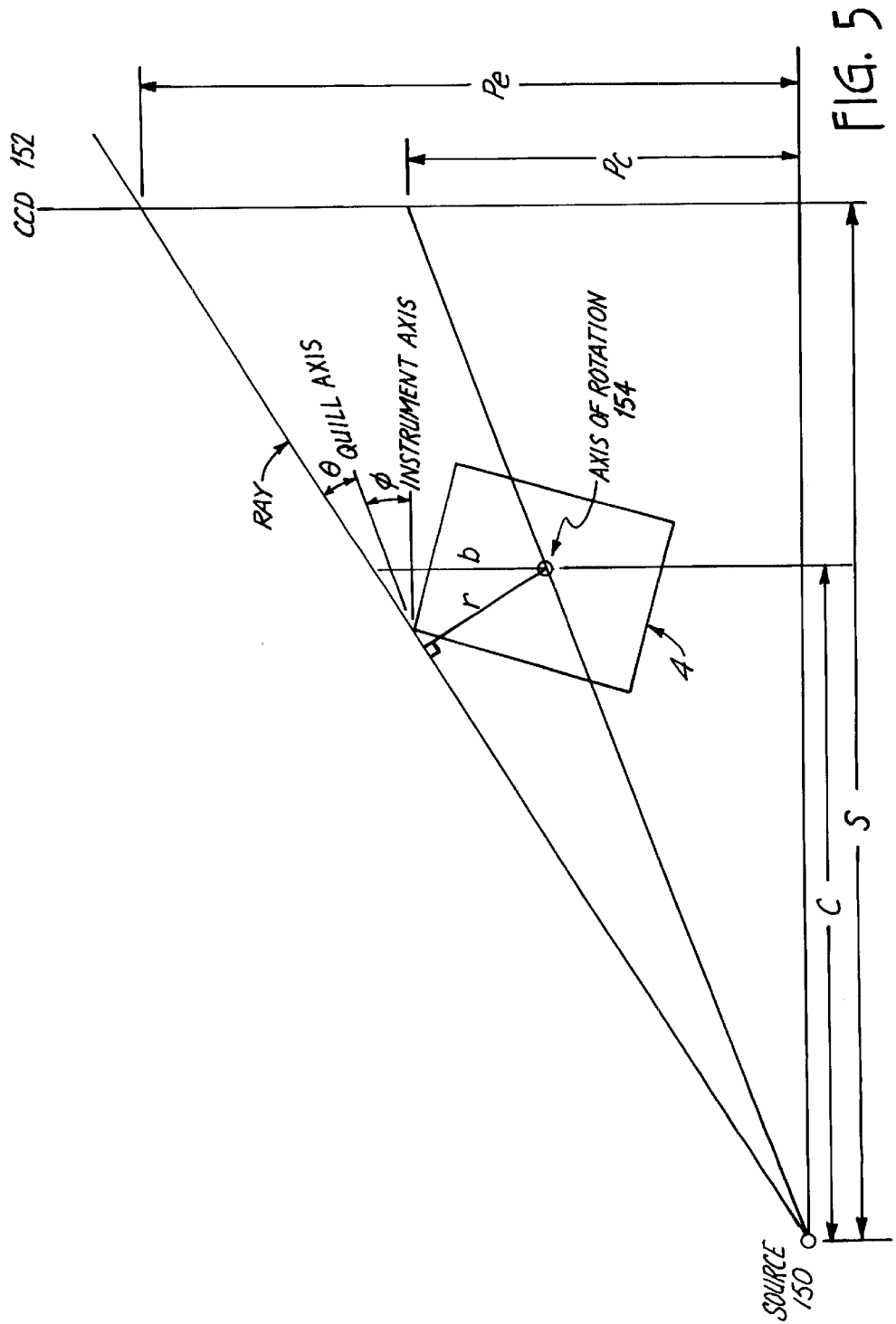
FIG. 5 is a diagram illustrating a relationship between a light source and a shadow image cast by an object onto a detector in the sensor.

In an alternative embodiment of sensor 8 which is more compact and less expensive to build but more computationally intensive, a point source at a finite distance is used. There is still a one-to-one mapping between the shadow projection on the detector array 11, quill angle φ, and parameters r and θ, but the transformation is no longer trivial, since the angle of the rays (relative to the instrument coordinate frame) vary from one side of the beam to the other. FIG. 5 depicts the geometry with a source of finite distance: the distance along the optical axis from source 150 to the plane of CCD 152 is denoted by S, the distance along the optical axis to a normal plane containing axis of rotation 154 is denoted by C, the pixel location of the projection of axis 154 is denoted by $p_c$, the pixel location of the shadow of the edge of object 4 is denoted by $P_e$, and the angle of ray grazing the edge of object 4 is denoted by θ. The radial parameter r, and the auxiliary distance b are also illustrated in FIG. 5. Distance parameter r can be expressed as follows:

$$r = b \cos \theta \qquad \text{Eq. (3)}$$

using analytical geometry, this becomes $$r = \frac{(p_e - p_c)C}{\sqrt{S^2 + p_e^2}} \qquad \text{EQ. (4)}$$

and θ can be found through the equation $$\theta = -\phi + \tan \frac{p_e}{S}. \qquad \text{EQ. (5)}$$

Figure 6A:
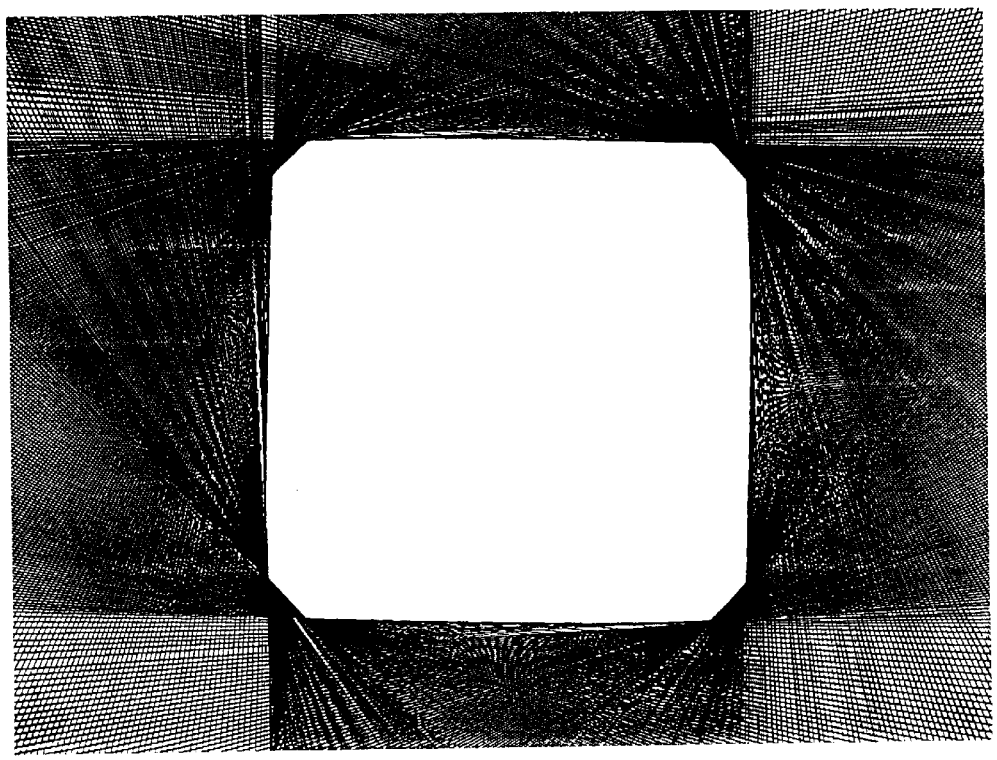
FIGS. 6A and 6B show steps in a reconstruction process in accordance with the present invention.
Figure 6B:
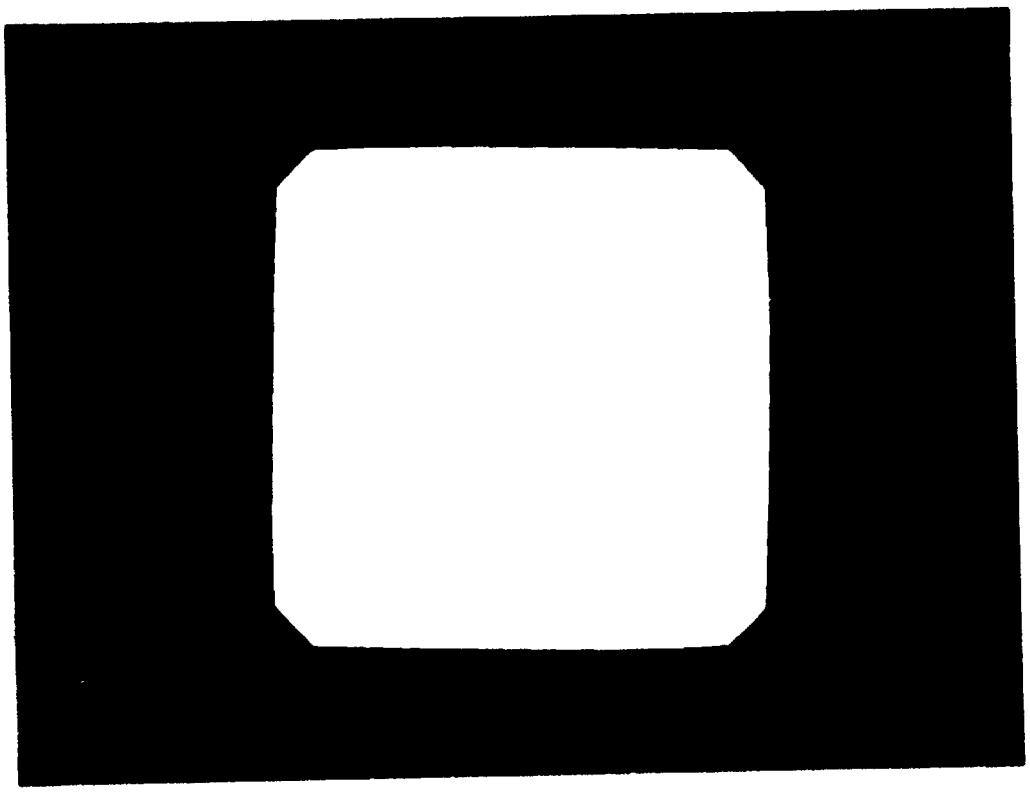

FIGS. 6A–6B are images which show the convex hulls determined in accordance with the techniques of the present invention. FIG. 6A shows the outline of an object formed by a plurality of vertices. FIG. 6B shows a binary image obtained from the data in FIG. 6A which can be delivered to a subsequent image processing or display system. Because the present invention preferably uses a 1-D array (linear array) as its imaging element, rather than a 2-D array (area array), high resolution is easily achieved, and costs are relatively low. For instance, a 5000-element linear array can be purchased for less than $100, but area arrays providing comparable resolution (for instance, 4096×4096) are at the limit of what is currently available, and cost in excess of $10000. Furthermore, the clocking requirements for area arrays are more complicated than for linear arrays.

The present invention can be retrofit to function with existing image processing or display systems such as those used in existing pick and place machines. Further, the data output of the present invention can be used with any type of image analysis software including existing software used in pick and place machines. A digital zoom function can be easily implemented to provide greater detail.

Although the present invention has been described with reference to preferred embodiments and disclosed with reference to a pick and place machine, it is usable for tomographic reconstruction of a plurality of shadowed one dimensional images into a two dimensional image of an opaque object. Workers skilled in the art will recognize that changes can be made in form and detail without departing from the spirit and scope of the invention.

What is claimed is:

1. A method of reconstructing a two dimensional outline of an opaque object, the method comprising:
   a) casting a shadow of the object onto a detector while the object rotates, the shadow forming a shadow image on the detector;
   b) detecting at least one edge of the shadow image;
   c) storing a data pair formed by the at least one edge of the shadow image and the angle and repeating the steps of casting, detecting and storing until at least two data pairs are stored;
   d) computing a set of vertices from the at least two data pairs; and
   e) reconstructing the two dimensional outline of the object from the set of vertices.

2. The method of claim 1 wherein the step of computing the set of vertices is computed by the Equation:

$$\begin{bmatrix} \cos\theta_I & \sin\theta_I \\ \cos\theta_{I-1} & \sin\theta_{I+1} \end{bmatrix} \begin{bmatrix} x \\ y \end{bmatrix} = \begin{bmatrix} r_I \\ r_{I+1} \end{bmatrix}.$$

where $\theta_I$ is an angle corresponding to a half shadow width $r_I$, $r_I$ is a half shadow width, x is an x-coordinate of a vertex and y is a y-coordinate of a vertex;
repeating the aforementioned computing step N times, where N represents a plurality of angles; and
using the set of vertices to provide the two dimensional outline.

3. The method of claim 1 wherein the two dimensional outline is provided in an electronic format.

4. The method of claim 3 wherein the electronic format is a video format used to provide a raster image.

5. The method of claim 4 wherein the video format is RS-170.

6. The method of claim 1 wherein the steps (a) and (b) are performed while the object is being moved towards the PC board.

7. The method of claim 1 wherein the step of casting (c) through the step of placing (e) are performed while the object is stationary.

8. The method of claim 1 wherein the object is an electronic component releasably held by a nozzle in a pick and place machine and the rotation is performed by the nozzle.

9. The method of claim 1 wherein the two data pairs are used to complete one vertex, where the angles in the data pairs are proximate to each other.

10. A method for picking and placing an electronic component, the method comprising:
   a) picking up the component;
   b) rotating the component around an axis of rotation to a selectable angle;
   c) casting a shadow of the component onto a detector, the shadow cast from a stationery source and the detector providing a shadow image;
   d) analyzing the shadow image to locate at least one edge;
   e) storing a data pair including the at least one edge and the selectable angle corresponding thereto;
   f) performing steps b), c), and d) a plurality of times;
   g) computing a set of vertices from the data pairs;
   h) reconstructing a two dimensional outline of the component from the set of vertices;
   i) computing an orientation of the component from a known reference;
   j) comparing the orientation of the component from i) to a desired orientation of the component and computing a compensated movement so as to orient the component for placement in the desired orientation; and
   k) placing the component on a PC board as a function of the compensated movement.

11. The method of claim 10 wherein the step of casting a shadow is performed while the component is being moved towards the PC board.

12. The method of claim 10 wherein the step of casting is performed while the component is not being translated with respect to a printed circuit board.

13. The method of claim 10 wherein the two data pairs are used to compute one vertex of the component and the angles are taken at successive selectable angles.

14. The method of claim 11 wherein the step of computing the set of vertices is computed as a function of $\theta$ and r, where $\theta_I$ is the angles corresponding to a half shadow width $r_I$ and $r_I$ is the half shadow width.

* * * * *